United States Patent Office.

ERNST KÖNIG, OF HÖCHST-ON-THE-MAIN, GERMANY, ASSIGNOR TO THE FARB-WERKE, VORMALS MEISTER, LUCIUS & BRÜNING, OF SAME PLACE.

BASIC RED DISAZO DYE.

SPECIFICATION forming part of Letters Patent No. 602,637, dated April 19, 1898.

Application filed May 6, 1897. Serial No. 635,396. (Specimens.)

*To all whom it may concern:*

Be it known that I, ERNST KÖNIG, doctor of philosophy, a citizen of the Empire of Germany, residing at Höchst-on-the-Main, Germany, have invented certain new and useful Improvements in the Manufacture of a Scarlet-Red Dyestuff, of which the following is a specification.

This invention relates to a basic scarlet-red disazo dyestuff which is obtained by the action of diazotized meta-trimethyl ammonium phenyl-azo-meta-toluidin upon beta-naphthol.

The reaction is set out in the following equation:

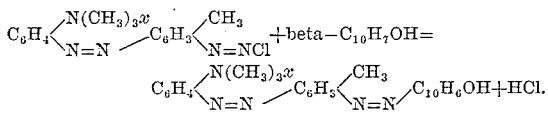

$x$ in the foregoing equation means chlorin or an equivalent radical of an acid.

I proceed, for instance, as follows: 47.7 kiols of the zinc chlorid double salt of meta-trimethyl ammonium phenyl-azo-meta-toluidin hydrochlorid are dissolved in about one thousand liters of water and diazotized at 10° to 15° centigrade by the addition of twenty kilos of hydrochloric acid of 20° Baumé and 6.9 kilos of sodium nitrite. The solution thus obtained is run into a solution of 14.4 kilos of beta-naphthol and four kilos of caustic soda under gradual addition of fifteen kilos of acetate of sodium. When the reaction is completed, the whole is brought into solution by heating, and the dyestuff is separated with common salt from the filtered solution.

The dyestuff thus obtained has the following properties: It forms a brown-red powder soluble in water with a blue-red color. Soda changes it to yellowish red and soda-lye to violet. Hydrochloric acid produces a red-yellow solution. It dissolves in concentrated sulfuric acid with a green color. It is soluble in alcohol and insoluble in ether, benzene, or petroleum ether.

The new dyestuff dyes tanned and untanned cotton scarlet red, as well as half-wool, evenly in an acid-bath.

Having thus described my invention, I claim as new and desire to secure by Letters Patent—

As a new product, the scarlet-red dyestuff, obtained from diazotized meta-trimethyl ammonium phenyl-azo-meta-toluidin and beta-naphthol, being a brown-red powder, soluble in water with a blue-red color, soluble in alcohol, insoluble in benzene, ether or petroleum ether, and dyeing tanned and untanned cotton as well as half-wool scarlet red in an acid-bath, substantially as set forth.

In testimony that I claim the foregoing as my invention I have signed my name in presence of two subscribing witnesses.

ERNST KÖNIG.

Witnesses:
 HEINRICH HAHN,
 ALFRED BRISBIN.